(12) United States Patent
Shaffer et al.

(10) Patent No.: US 9,872,442 B2
(45) Date of Patent: Jan. 23, 2018

(54) BIODEGRADABLE SHIELD FOR PLANT PROTECTION

(71) Applicant: Selfeco LLC, Stillwater, MN (US)

(72) Inventors: Chadwick Aaron Shaffer, Oakdale, MN (US); Daniel George Mishek, Roseville, MN (US)

(73) Assignee: SELFECO LLC, Stillwater, MN (US)

( * ) Notice: Subject to any disclaimer, the term of this patent is extended or adjusted under 35 U.S.C. 154(b) by 95 days.

(21) Appl. No.: 14/658,724

(22) Filed: Mar. 16, 2015

(65) Prior Publication Data

US 2016/0270305 A1    Sep. 22, 2016

(51) Int. Cl.
*A01G 13/00* (2006.01)
*A01G 13/10* (2006.01)

(52) U.S. Cl.
CPC ................... *A01G 13/105* (2013.01)

(58) Field of Classification Search
CPC ....... A01G 13/10; A01G 13/105; A01G 13/04
USPC ............................................................ 47/30
See application file for complete search history.

(56) References Cited

U.S. PATENT DOCUMENTS

| | | | | |
|---|---|---|---|---|
| 592,640 | A * | 10/1897 | Orner .................. | A01G 13/0243 47/30 |
| 1,423,659 | A * | 7/1922 | Hassel .................. | A01G 13/105 47/30 |
| 2,784,528 | A * | 3/1957 | Rudenauer ............. | A01G 25/00 47/21.1 |
| 3,826,040 | A * | 7/1974 | Roberts ............... | A01G 13/0243 428/36.9 |
| 5,647,169 | A * | 7/1997 | Bui ........................ | A01G 13/10 47/33 |

(Continued)

FOREIGN PATENT DOCUMENTS

EP    0 716 804 A1    6/1996

OTHER PUBLICATIONS

Making packaging greener—biodegradable plastics, Jan. 23, 2007, retrieved from internet: Oct. 13, 2016 10 13, Australian Academy of Science, http://people.oregonstate.edu/~rochefow/STEPS %20Plastics%20in%20Daily%Life/Articles%20on%20Plastics/ Biodegradeable%20Plasics/BiodegradeablePlastic.pdf.*

*Primary Examiner* — Kristen C Hayes
(74) *Attorney, Agent, or Firm* — Kagan Binder, PLLC (57) ABSTRACT

Shielding for the protection of plants and seedlings from ground pests is provided. Shields can be comprised of materials including biodegradable materials that have the advantage of being formed into plant protection shields with various features, such as by an injection molding process, but that can be buried within the soil along with a plant's roots. Plant shields are provided for being partially buried in soil to surround a plant and for providing above-ground protection from ground travelling pests. Such shields can comprise a walled structure surrounding and creating an open-ended enclosure with the shield comprising an above the ground portion and a below the ground portion. The shield may comprises a Biodegradable Plastic that includes plant nutrients within the Biodegradable Plastic. The above the ground portion and the below the ground portion can be divided from one another by a divider that extends along an external surface of the walled structure in a similar direction as the walled structure surrounds the enclosure, the divider element comprising a ground engagement surface for limiting insertion of the shield into the soil.

20 Claims, 7 Drawing Sheets

(56) References Cited

U.S. PATENT DOCUMENTS

| | | | |
|---|---|---|---|
| 5,798,436 A | 8/1998 | Gruber et al. | |
| 8,181,386 B1* | 5/2012 | Riley, Jr. ............ | A01G 13/0243 47/29.1 |
| 8,826,588 B1* | 9/2014 | MacKichan ............ | A01G 9/12 47/30 |
| 2002/0172704 A1* | 11/2002 | Hsieh ................... | A01G 13/105 424/406 |
| 2005/0081426 A1* | 4/2005 | Hsia ..................... | A01M 29/30 43/124 |
| 2009/0272033 A1 | 11/2009 | Paleari | |
| 2012/0005952 A1* | 1/2012 | Lohse ................. | A01G 13/043 47/21.1 |

* cited by examiner

BIODEGRADABLE SHIELD FOR PLANT PROTECTION

FIELD OF THE INVENTION

The present invention is directed to a shield for plants, particularly seedlings, as planted in the soil for preventing pests and other insects such as cutworms to have access to the plant stems and roots. More particularly, the present invention is directed to plant shields that also can be buried in the ground and that can add nutrients to the soil in order to facilitate plant root growth.

BACKGROUND

The destruction of plant seedlings can occur by the attack by insects or other pests that live in the soil, such as the commonly known cutworm. Typically, such pests attack the plants when they are seedlings and first planted before they have the ability to grow sufficiently to be more resistant to such attacks. These pests will eat at the seedling stem just at or below the ground surface level causing the plant to fall over and die. In the case of cutworms and other pests, they typically travel along or within a few inches below the soil surface to eat at the plant stem and/or roots. It has been found that by creating a barrier that surrounds the plant and that extends sufficiently above the soil surface, attacks by cutworms can be prevented.

To prevent cutworm attacks, shields such as rings of plastic or paper materials have been utilized that basically comprise an annular wall that can be positioned around a newly planted seedling. For example, a ring shield can be passed over a seedling as such is planted in the ground and then pushed partially into the ground leaving a portion of the shield extending above the ground surface. A ring partially buried can provide protection from all directions. Such a ring would also provide a partial barrier for a determined degree below the soil surface based upon the depth of burying of the ring around the seedling.

Such pest barriers can be composed of a relatively permanent material, such as a plastic or metal material, or can be degradable, such as made from cardboard tubing. At the end of a growing season, the rings can be removed from the ground and thrown away or can be saved for use again. These known barriers comprise rings that are normally cut from an elongate tube of the desired material and thus provide a simple annular wall that otherwise lacks other features.

Degradable materials have also been known for making plant pots, such as comprising a biological material like compressed peat moss. By known techniques, such pots can be formed from the compressed peat moss into the shape of a container. The frailness of the material itself does not, however, lend these pots to having many features. More recently, other materials have been developed for seed planting and the transport and use of plant seedlings that are also capable of being buried into the ground with plant roots.

United States Patent Application Publication No. 2009/0272033 describes biodegradable germinating pods for seedlings. The body of the tubular pods consists of 20 to 70% cellulose, 5 to 20% calcium carbonate, 30 to 70% calcium sulfate, and micronutrients.

European Patent No. 0 716 804 discloses soil decomposing seedling pots wherein coconut shell powder is mixed into a biodegradable plastic made of carboxylic acid-based compounds such as an aliphatic acid or lactic acid. The pot is made by injection molding.

SUMMARY OF THE INVENTION

Shielding for the protection of plants and seedlings from ground pests is advantageously provided. Shields can be comprised of materials including biodegradable materials, including those with plant nutritive effects, that have the advantage of being formed into plant protection shields with various features, such as by an injection molding process, but that can be buried within the soil along with a plant's roots.

Plant shields are provided for being partially buried in soil to surround a plant and for providing above-ground protection from ground travelling pests. Such shields can comprise a walled structure surrounding and creating an open-ended enclosure with the shield comprising an above the ground portion and a below the ground portion.

In one aspect of the present invention, a plant shield is provided that can be partially buried in soil to surround a plant and for providing above-ground protection from ground travelling pests. The shield can comprise a walled structure surrounding and creating an open-ended enclosure, the shield comprising an above the ground portion and a below the ground portion that are divided from one another by a divider that extends along an external surface of the walled structure in a similar direction as the walled structure surrounds the enclosure, the divider element comprising a ground engagement surface for limiting insertion of the shield into the soil.

Preferably, the divider extends so as to completely surround the shield along its external surface creating a fully surrounding ground engagement surface. The walled structure can comprise plural components with each shield component creating a portion of the enclosure, whereby the shield can be assembled about a plant as such plant is previously planted in the soil. It is also contemplated that the shield components can include complimentary alignment elements provided along side edges of each component that facilitate positioning and assembly of the plural shield components to one another to create the open-ended enclosure. Preferably also, the divider comprises plural divider elements with one divider element extending along each shield component so that when the shield components are assembled, the fully surrounding ground engagement surface is provided. As such, the above ground portion can comprise a portion of the walled structure above the divider that provides a continuous barrier for above the ground in use surrounding the enclosure. The below the ground portion can comprises a portion of the walled structure below the divider that is a continuous barrier or alternately it can include at least one open area in the direction of extension of the divided but below the divider. Preferably, the shield comprises a Biodegradable Plastic that includes plant nutrients within the Biodegradable Plastic.

In another aspect of the present invention, a plant shield can be provided for being partially buried in soil to surround a plant and for providing above-ground protection from ground travelling pests, According to an embodiment, the shield can comprise a walled structure surrounding and creating an open-ended enclosure with the shield comprising an above the ground portion and a below the ground portion, wherein the shield comprises a Biodegradable Plastic that includes plant nutrients within the Biodegradable Plastic.

Preferably, the above the ground portion and the below the ground portion are divided from one another by a divider that extends along an external surface of the walled structure in a similar direction as the walled structure surrounds the enclosure, the divider element comprising a ground engagement surface for limiting insertion of the shield into the soil. More preferably, the divider extends so as to completely surround the shield along its external surface creating a fully surrounding ground engagement surface.

The walled structure of the shield can comprise plural components with each shield component creating a portion of the enclosure, whereby the shield can be assembled about a plant as such plant is previously planted in the soil. The shield components can include complimentary alignment elements provided along side edges of each component that facilitate positioning and assembly of the plural shield components to one another to create the open-ended enclosure. Preferably, the divider comprises plural divider elements with one divider element extending along each shield component so that when the shield components are assembled, the fully surrounding ground engagement surface is provided. As such, the above ground portion can comprise a portion of the walled structure above the divider that provides a continuous barrier for above the ground in use surrounding the enclosure. The below the ground portion can comprises a portion of the walled structure below the divider that is continuous or can include at least one open area in the direction of extension of the divided but below the divider. Preferably, the Biodegradable Plastic comprises an injection moldable Biodegradable Plastic.

DETAILED DESCRIPTION

The present invention relates to the shielding or protection of plant seedlings, in particular. Preferably, shields of the present invention are comprised of biodegradable materials that have the advantage of being formed into a desired shield shape to prevent pest attacks along the soil surface, wherein the shields can include various features. Shields of the present invention can be buried along with a plant and can preferably be made by known or developed plastic forming and/or molding processes so that such shields can include any features that can be produced by the plastic forming process. More preferably, biodegradable plastics utilized in accordance with the present invention have properties such that the plastic can be injection molded (forcing molten plastic into a prefabricated mold by pressure) and yet provide a stable structural container that will last in accordance with predetermined set needs, which needs may include environmental aspects, timing aspects and decompositional aspects. By utilizing injection molding, containers can be formed with many advantageous features as described below. Any plastic forming technique can be utilized, such as machining, vacuum forming, thermoforming, molding, cast molding, blow molding, and other well-known molding techniques. Plastic items of the present invention can also be made by a 3D printing process, including fused deposition modeling, selective laser sintering, or selective heat sintering, as examples. In an embodiment of the present invention, the shields of the present invention are prepared from a machinable Plastic. Plastics can be machined by many different techniques including CNC machining processes of many types. An advantage of injection molding is the ability to easily and cheaply create shields with advantageous features for the present invention.

For purposes of the present invention, a plastic material is "recyclable" if it can be re-used and/or recovered as discussed in the Guidelines for the recovery and recycling of plastics waste set forth in ISO 15270:2008.

For purposes of the present invention, a "Biodegradable Plastic" is a degradable plastic in which the degradation results from the action of naturally occurring microorganisms such as bacteria, fungi and algae.

For purposes of the present invention, an "Industrially Compostable Plastic" is a plastic that undergoes degradation by biological processes during composting in a municipal or industrial aerobic composting facility to yield $CO_2$, water, inorganic compounds and biomass at a rate consistent with other compostable materials and leaves no visible, distinguishable or toxic residue as set forth in ASTM D6400.

For purposes of the present invention, a "{number} Day Garden Compostable Plastic" is a plastic that undergoes degradation by biological processes to yield $CO_2$, water, inorganic compounds and biomass and leaves no visible, distinguishable or toxic residue within an identified number of days after placement in conventional garden soil at temperatures of from about 65° to 75° F. A "360 Day Garden Compostable Plastic" is a plastic wherein the degradation takes place within 360 days. A "180 Day Garden Compostable Plastic" is a plastic wherein the degradation takes place within 180 days. A "90 Day Garden Compostable Plastic" is a plastic wherein the degradation takes place within 90 days. A "45 Day Garden Compostable Plastic" is a plastic wherein the degradation takes place within 45 days.

In an embodiment, the Biodegradable Plastic is an Industrially Compostable Plastic. In an embodiment, the Biodegradable Plastic is a 360 Day Garden Compostable Plastic. In an embodiment, the Biodegradable Plastic is a 180 Day Garden Compostable Plastic. In an embodiment, the Biodegradable Plastic is a 90 Day Garden Compostable Plastic. In an embodiment, the Biodegradable Plastic is a 45 Day Garden Compostable Plastic. In an embodiment, the Biodegradable Plastic is a 30 Day Garden Compostable Plastic. In an embodiment, the Biodegradable Plastic is a 20 Day Garden Compostable Plastic. In an embodiment, the Biodegradable Plastic is a 15 Day Garden Compostable Plastic.

In a preferred embodiment of the present invention, any of the various embodiments of Biodegradable Plastic described above are formulated as injection moldable Biodegradable Plastic. In an embodiment of the present invention, any of the various embodiments of Biodegradable Plastic described above are formulated as a reaction injection moldable Biodegradable Plastic. In an embodiment of the present invention, any of the various embodiments of Biodegradable Plastic described above are formulated as a thermoforming Biodegradable Plastic. In an embodiment of the present invention, any of the various embodiments of Biodegradable Plastic described above are formulated as a vacuum forming Biodegradable Plastic. In an embodiment of the present invention, any of the various embodiments of Biodegradable Plastic described above are formulated as a blow molding Biodegradable Plastic. In an embodiment of the present invention, any of the various embodiments of Biodegradable Plastic described above are formulated as a cast molding Biodegradable Plastic. In an embodiment of the present invention, any of the various embodiments of Biodegradable Plastic described above are formulated as a rotational molding Biodegradable Plastic. In an embodiment of the present invention, any of the various embodiments of Biodegradable Plastic described above are formulated as a spin casting Biodegradable Plastic. In an embodiment of the present invention, any of the various embodiments of Biodegradable Plastic described above are formulated as a compression moldable Biodegradable Plastic. In an embodiment of the present invention, any of the various embodiments of Biodegradable Plastic described above are formulated as a machinable Biodegradable Plastic.

In an embodiment, the Biodegradable Plastic comprises a polymer selected from the group consisting of polylactic acid polymer, polyhydroxyalkanoate polymer, starch based resin, polyesters, cellulose esters, biobased polyethylene compounds, and mixtures thereof.

In an embodiment, the Biodegradable Plastic comprises polylactic acid polymer. Polylactic acid polymer (or "PLA") is derived from a sugar source such as corn, cellulosic raw materials, agricultural wastes and non-food plants. PLA polymers are described, for example, in U.S. Pat. No. 5,798,436, the disclosure of which is incorporated herein by reference. A PLA is sold under the brand name Ingeo™ by NatureWorks LLC. In an embodiment, the Biodegradable Plastic is a blend of co-polyester and PLA, optionally with additional natural fillers and the like. Such blends are commercially available under the name BIO-FLEX® from FKuR Kunststoff GmbH, Willich, Germany.

In an embodiment, the Biodegradable Plastic comprises polyhydroxyalkanoate polymers (PHAs) such as those sold under the brand Mirel™ resins from Metabolix, Cambridge Mass., and polyhydroxy-butyrate-co-valerate (PHBV) resins from TianAn® Biologic Material Co., Zhejiang, China.

In an embodiment, the Biodegradable Plastic comprises cellulosic resins sold under the brand BIOGRADE® injection moldable cellulosic from FKuR Kunststoff GmbH, Willich, Germany.

In an embodiment, the Biodegradable Plastic comprises co-polymerizable components, such as soy proteins. Suitable soy proteins include soy protein concentrates (SPCs) and soy protein isolates (SPCs), which are commercially available from Solae Company, St. Louis, Mo.

In an embodiment, the Biodegradable Plastic comprises an organic filler material, such as polyethylene glycol, glycerol, zein, corn starch, distillers dry grains with solubles, and mixtures thereof. In an embodiment, the Biodegradable Plastic comprises an organic filler material that is distillers dry grains with solubles ("DDGS"), such as a DDGS sold under the brand BioRes™ by Laurel Biocomposite LLC.

In an embodiment, the Biodegradable Plastic comprises an inorganic filler material, such as nanoclays.

It will be appreciated that the skilled artisan is capable of adjusting the length of time required for biodegradation of shields of the present invention by selection of the dimensions of the shield (e.g. including relative thickness of zones or portions of the shield), as further discussed below, and/or incorporating varying amounts or organic filler, reactive species and enzymes that hasten the biodegradation of the material.

In an embodiment, the Biodegradable Plastic is further augmented with plant-beneficial nutrients. In an embodiment, fertilizing components such as nitrogen (N), phosphorus (P), and potassium (K) may be added to the Biodegradable Plastic, and will be released to the seedling and later in the soil. In addition, as the Biodegradable Plastic becomes soluble after planting, they release part of the fertilizing components or micronutrients that are part of their structure.

In an embodiment, the Biodegradable Plastic is further augmented with micronutrients to promote plant grown of plants to be provided in the present horticulture containers. Examples of such micronutrients include Calcium (Ca), Cobalt (Co), Copper (Cu), Zinc (Zn), Magnesium (Mg), Iron (Fe), Sulfur (S), Boron (B), Sodium (Na), Manganese (Mn), and Molybdenum (Mo). Examples of amounts of such micronutrients to be incorporated include 0.001 to 15% Copper (Cu), 0.001 to 15% Zinc (Zn), 0.001 to 15% Magnesium (MG), 0.001 to 15% Iron (Fe), 0.001 to 15% Sulfur (S), 0.001 to 10% Boron (B), 0.001 to 10% Sodium (Na), 0.001 to 10% Manganese (Mn), 0.001 to 5% Molybdenum (Mo), and 0.001 to 5% Cobalt (Co). In an embodiment, micronutrients are added in the proportion of up to 5% for vegetable seedlings, up to 10% for fruit tree seedlings, and up to 15% for reforestation seedlings.

In an embodiment, the nutrients and/or micronutrients are distributed through the Biodegradable Plastic such that the Biodegradable Plastic has a visually homogeneous appearance. In an embodiment, the nutrients and micronutrients are distributed through the Biodegradable Plastic such that separate regions of nutrient and/or micronutrient components are visually identifiable in the Biodegradable Plastic.

Figure 1:
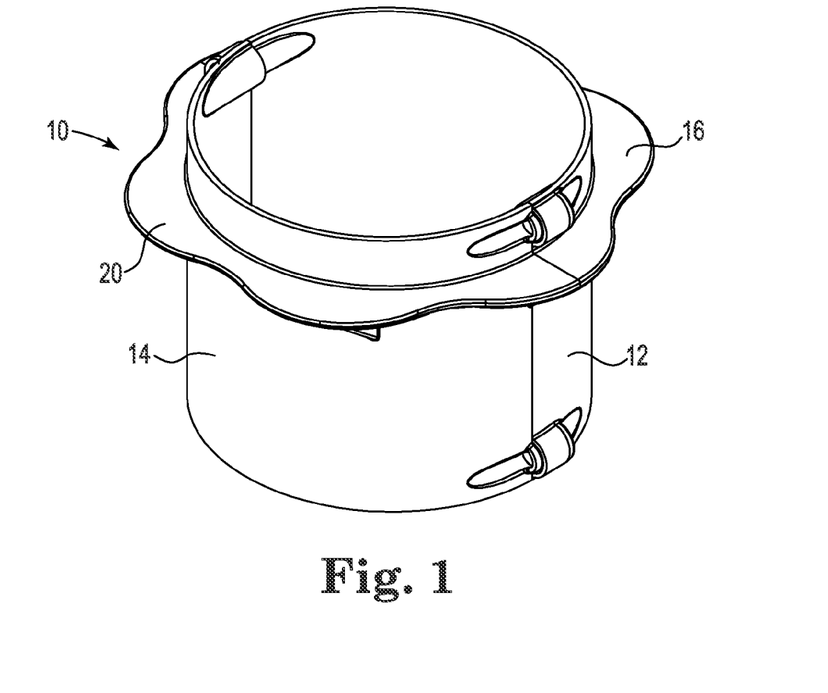
FIG. 1 is a perspective view of an embodiment of a plant protection shield in accordance with the present invention, the plant protection shield having a substantially circular top opening and having a generally cylindrical design from top to bottom with a divider structure dividing the shield into an above ground portion and a below ground portion.

Referring to FIG. 1, a specific embodiment of a plant shield 10 of the present invention is shown that preferably comprises Biodegradable Plastic, as described above. More preferably, the shield 10 is an injection moldable Biodegradable Plastic. It is, however, contemplated that the shield 10 of the present invention can comprise a plastic or other material that does not decompose at all, or even that is not recyclable. The shield 10 can be reusable over and over if made of a permanent material (that is to say reusable for as long as the material retains its properties sufficiently for use) or can be designed for a one time use within which time the material with biodegrade. Most preferably, the shield 10 will biodegrade in a predetermined use period and will also provide plant nutrients to a plants root system during this predetermined use period. It is also contemplated that the shield can degrade more quickly than a plants expected growth life (i.e. a growing season) so as to provide nutrients during a part of the plants growth life, such as early on growth. An advantage of preferred aspects of the present invention is that the shield can be positioned at least partially within the soil to surround a plant's stem either by passing the shield 10 over the plant or by assembling the shield 10 to surround the plant stem without having to pass over the plant. As such, shields 10 can be positioned at any time around a plant's stem for protection and continued feeding as desired.

Figure 2:
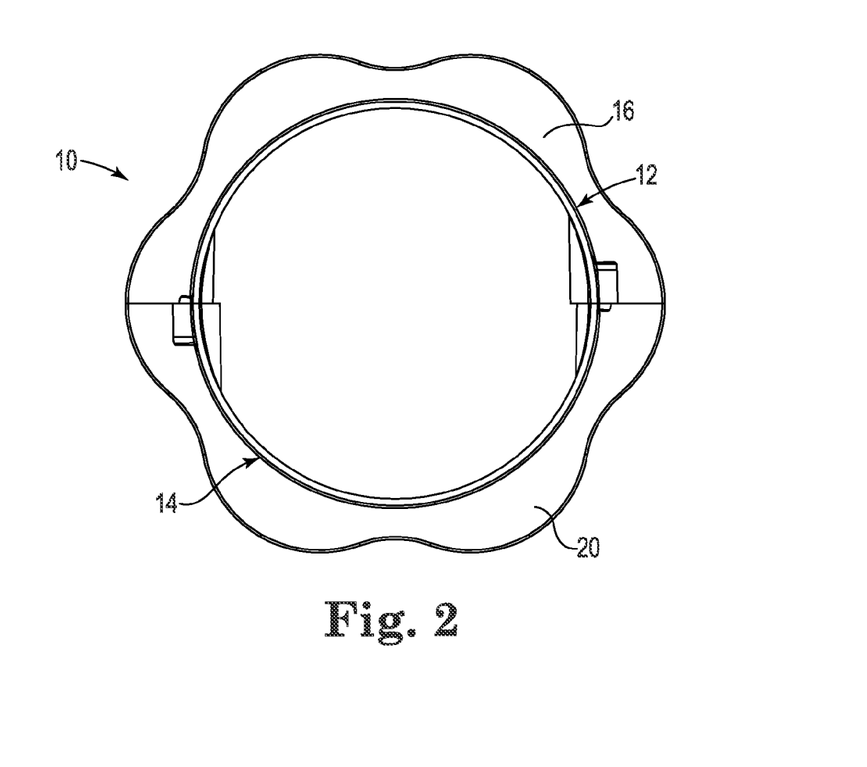
FIG. 2 is a top view of the shield showing the shield as comprising plural components.
Figure 3:
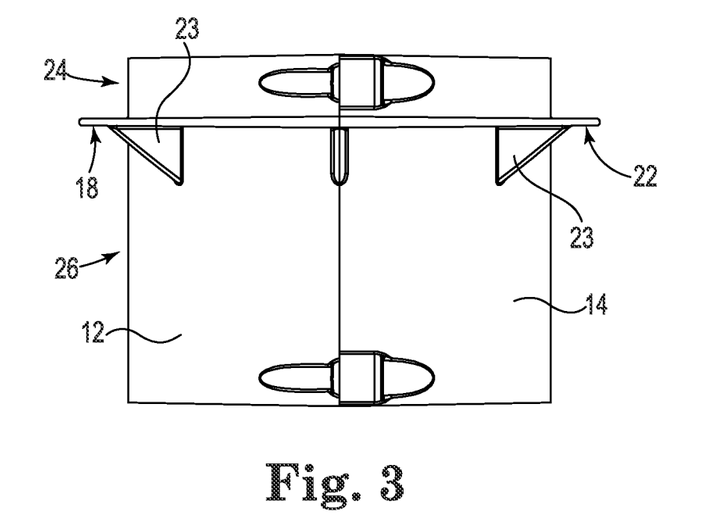
FIG. 3 is a side elevational view of the shield of FIG. 1 showing a set of tabs as inserted within a set of pockets of shield components.
Figure 4:
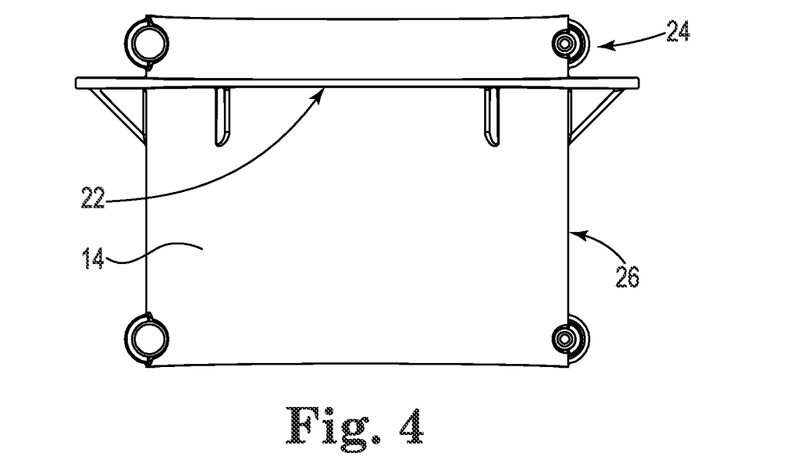
FIG. 4 is a front elevational view of the shield of FIG. 1.
Figure 5:
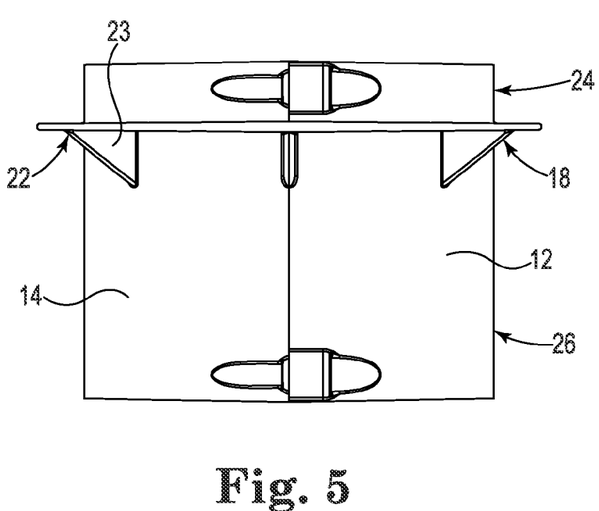
FIG. 5 is another side elevational view of the shield of FIG. 1 also showing a set of tabs as inserted within a set of pockets of shield components.
Figure 6:
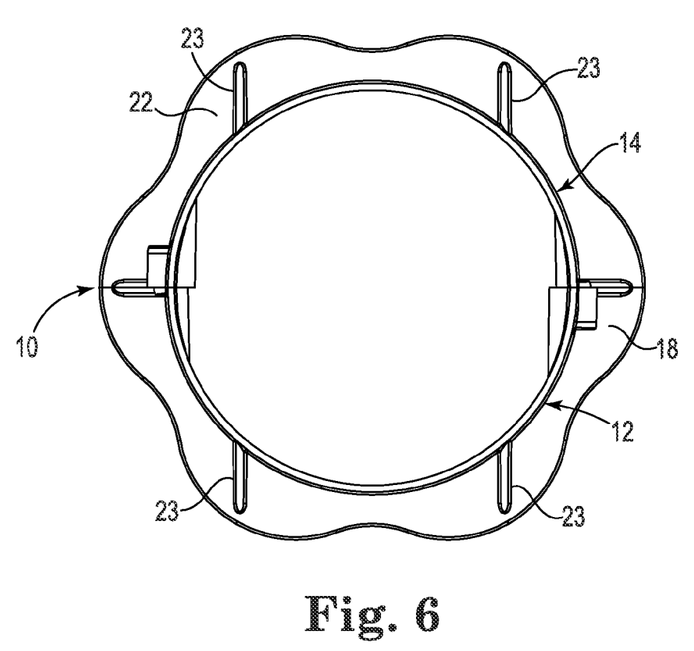
FIG. 6 is a bottom view of the shield of FIG. 1 showing the ground engagement surfaces of the component parts of the shield.
Figure 7:
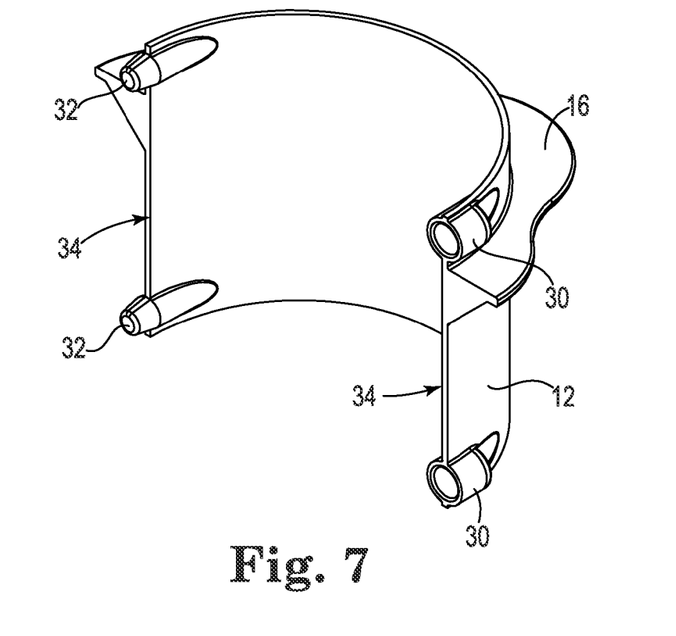
FIG. 7 is a perspective view of one component of a shield of the present invention, where plural similarly shaped components can be utilized together to create a shield of the present invention.
Figure 8:
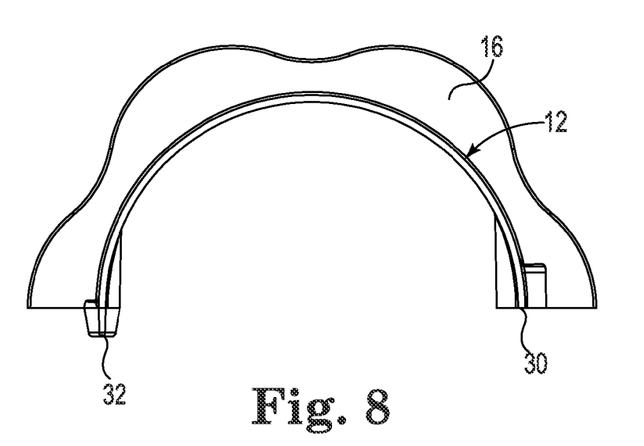
FIG. 8 is a top view of the shield component of FIG. 7 showing the shield component as including plural pockets and tabs for assembly.
Figure 9:
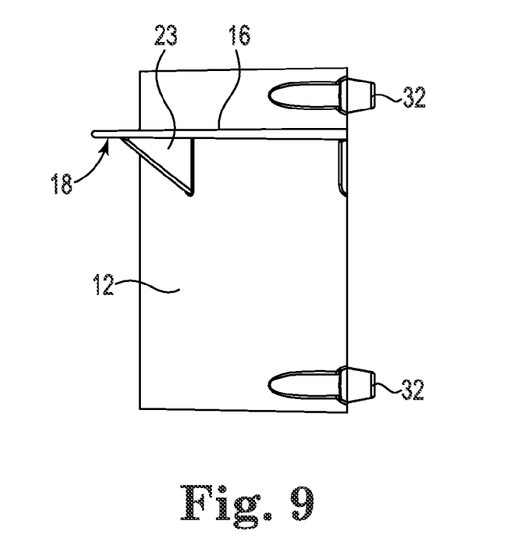
FIG. 9 is a side elevational view of the shield component of FIG. 7.
Figure 10:
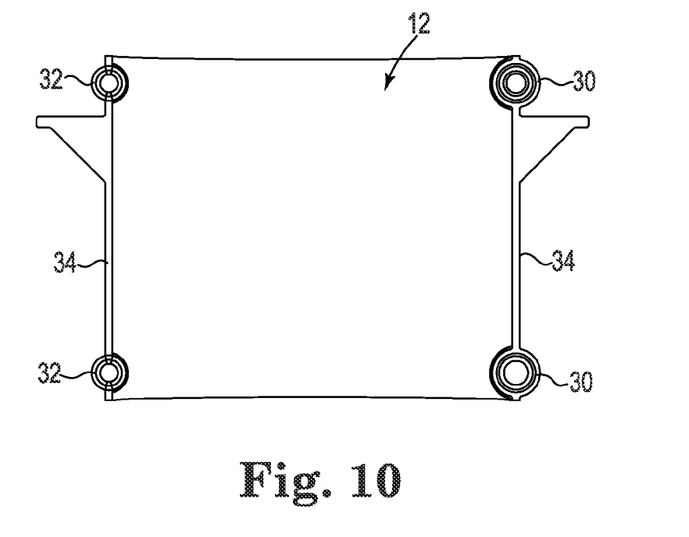
FIG. 10 is a front elevational view of the shield of FIG. 1 showing the interior surface of the component as such is utilized with other component(s) to create an enclosure.
Figure 11:
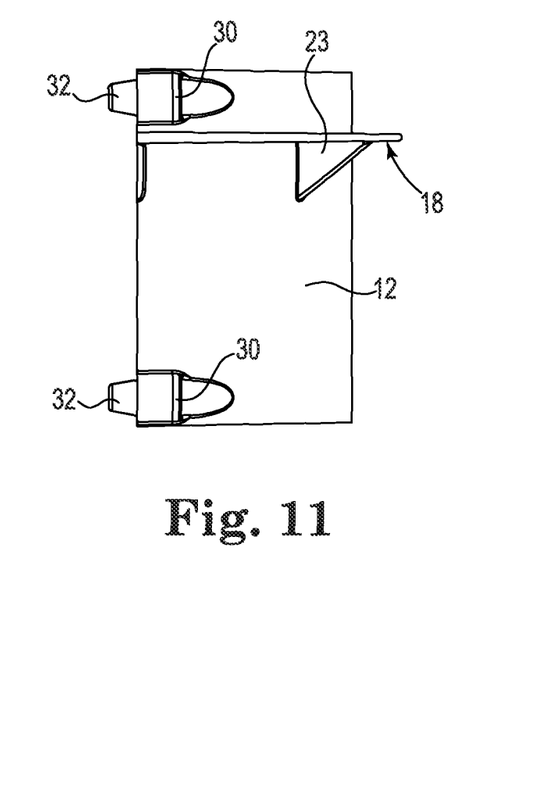
FIG. 11 is another side elevational view of the shield component of FIG. 7.
Figure 12:
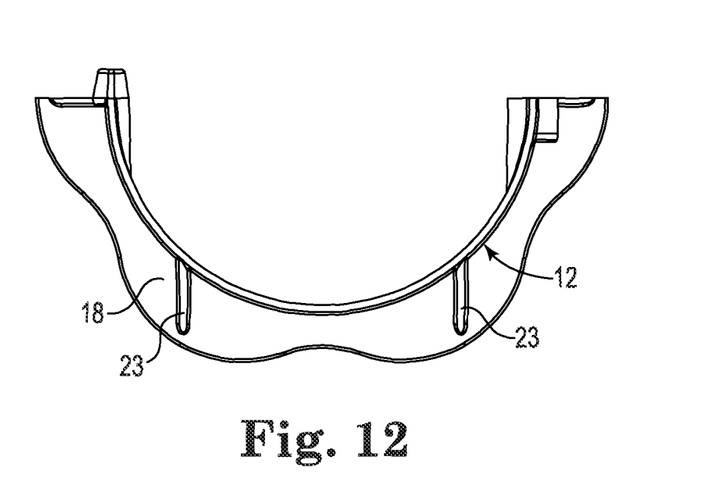
FIG. 12 is a bottom view of the shield component of FIG. 7 showing the ground engagement surface of the shield component.

As shown in FIG. 1, the shield 10 preferably comprises a muti-part construction. Specifically, the exemplary shield 10 comprises a first shield component 12 and a second shield component 14, which together define a shape that is sufficient to fully surround a plant stem. The shield 10 can comprise any shape as viewed from the top with a circular overall top shape shown in FIG. 2 as preferred. The shield 10 can also comprise more than two components to allow assembly about a plant stem that is planted already. Similar techniques as that shown and described below can be utilized for any number of components allowing assembly of the shield 10. For the sake of illustration, a circular top shape can create a generally cylindrical shield 10; however, the components 12 and 14 (and any others) can be shaped to create a truncated cone overall shape or otherwise. With a square top shape, an open box structure can be created from one or more components. Such components could be assembled together at corners or side walls as desired from use and making standpoints.

As above, it is preferable that the shield 10 be separable into at least two components, but it need not be. Especially in the case where the shield 10 comprise a Biodegradable Plastic with nutrient feeding capability. In any case, the one or more component parts of a shield of the present invention create an open-ended enclosure with the components providing a walled structure that can surround a plant when positioned around a plant.

Component 12 preferably includes a divider element 16 including a ground engagement surface 18 that determines how far the component will be buried or pushed into the soil for deployment. The divider 16 preferably extends along the component 12 for the same distance as the component extends to create a portion of an enclosure. The divider preferably extends along an external surface of the walled structure created by the components 12 and 14 in the direction that the shield 10 surrounds the plant and creates the open-ended enclosure. That way, with an open top and bottom, the divider 16 can divide the shield into an above the ground portion and a below the ground portion with the divider positioned substantially at ground level.

For a circular enclosure as shown, the divider 16 preferably extends over a similar arc length as the component 12. Likewise, component 14 preferably also includes a divider element 20 including a ground engagement surface 22 that determines how far the component 14 will be buried or pushed into the soil for deployment. This divider 22 preferably also extends along the component 14 for the same distance as the component extends to create a portion of an enclosure. For a circular enclosure as shown, the divider 22 preferably extends over a similar arc length as the component 14. Then, with the components 12 and 14 assembled or positioned next to one another in a manner to create an enclosure, preferably, the entire perimeter of the shield 10 will have a divider 16 or 20 extending around the shield 10. Gussets 23 are shown for providing structural support to the dividers 16 and 20 as such can be molded along with the components 12 and 14 and dividers 16 and 20, respectively.

The dividers 16 and 20 not only provide a peripheral ground engagement surface (made up of the surfaces 18 and 22 collectively), they divide the shield 10 into an above ground portion 24 and a below ground portion 26. The surface area total of the ground engagement surfaces 18 and 22 is preferably determined by the ability to create a sufficient barrier to effectively stop the shield 10 from going deeper into the soil during inserting into the ground under a desired amount of force, as such can be determined empirically or otherwise. The dividers 16 and 20 can be shaped in any way to provide a desired quantity of ground engaging surface area. A scalloped shaping is illustrated as such created a desired surface area and surface area for easy engagement by a user to push the shield 10 into the soil.

The above ground portion 24 provides protection from ground surface pests, such as cutworm, that attack a plant stem as they travel along the ground surface. Thus, it is preferable that the above ground portion create a full peripheral barrier about the shield 10 based upon whatever shape the shield 10 creates. The degree to which the above ground portion 24 extends above ground level, as defined by the ground engagement surfaces 18 and 22, is determined by the extent needed to prevent pest passage. Typically, this degree of extension needs to be sufficient to prevent the pest from passing or climbing over. Again, this can be determined empirically for effectiveness.

The below ground portion 26 is designed as a barrier as well below the ground surface, as defined by the ground engagement surfaces 18 and 22, but can provide another function. Preferably, at least the below ground portion of the shield 10 comprises a Biodegradable Plastic that is augmented with plant-beneficial nutrients. That way, the below ground portion 26 can have a feeding function as it biodegrades within the soil while the above ground portion 24 can protect the plant stem from pest attack, potentially even after the below ground portion 26 fully degrades.

An assembly of the components 12 and 14 is shown in FIGS. 1-6. FIGS. 7-12 show the one component 12 with an understanding that component 14 is similar. With the components provided with similar structure the components 12 and 14 can be fit together to create a shield 10 and enclosure. To assist in aligning the components 12 and 14 to one another to create an assembled shield 10, pockets 30 and tabs 32 are preferably provided along edge surfaces of the components 12 and 14 where the edges 34 come together for assembly. For example, a pair of spaced tabs 32 are shown extending from one edge surface 34 of component 12 with a similarly spaced set of pockets 30 provided along the other edge surface 34 of the component 12. With similarly formed component 14, the components 12 and 14 can be positioned and aligned to one another so that a set of tabs 32 of a first component 12 or 14 can fit within a set of pockets 30 of the second component 12 or 14, and likewise with the pockets 30 of the first component receiving the tabs 32 of the second component.

Preferably, the tabs 32 and pockets 30 are designed with complimentary feature shapes so that the pockets 30 receive the tabs 32. These pockets 30 and tabs 32 can more preferably be shaped and sized to provide for a friction fit to help keep the assembled shield 10 assembled. Such pockets 30 and tabs 32 can be manufactured as integral components with the components 12 and 14, such as by a molding process, or can comprise non-integrated components added to the structures of the components 12 and 14. The complimentary aspects of the pockets 30 and tabs 32 can further include features to more firmly connect the components 12 and 14 as an assembly. For example, one or more detent positions could be provided or a lock function can be added based upon the deflection of one complimentary feature to another, as such type features are well known in the assembly of plastic parts.

Figure 13:
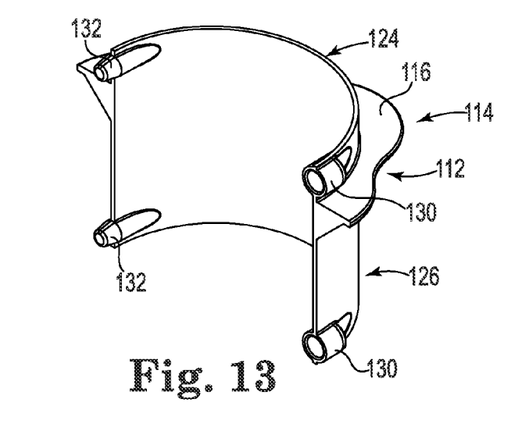
FIG. 13 is a perspective view of a shield component similar to that of FIG. 7, but with an alternative assembly features.

FIG. 13 shows a variation of the components 12 and 14 described above. One side of a shield component 112 is shown that would be similar and used with a component 114 of same design in the same manner as that described above. Like component 12, the component 112 includes a divider 116 that defines an above ground portion 124 and a below ground portion 126. A similarly functional connection as the pockets 30 and tabs 32 is shown at pockets 130 and pins 132. The pins 132 and pockets 130 can likewise be form integrally with the shield component 112, as above, or can be designed with non-integrated components. Pins 132 further shown the provision of a tapered insertion portion that further facilitates alignment of the shield components 112 and 114 to one another.

The shield 10, as described above, is formed without openings that could allow access to either the plant stem, i.e. above the ground, or to the plant's root system, i.e. below the ground. It is contemplated that a below ground portion 24 or 124 can otherwise be provided with other features. If the only concern is to protect the plant stem above ground from pest attack, openings or other features can be provided below ground.

Figure 14:
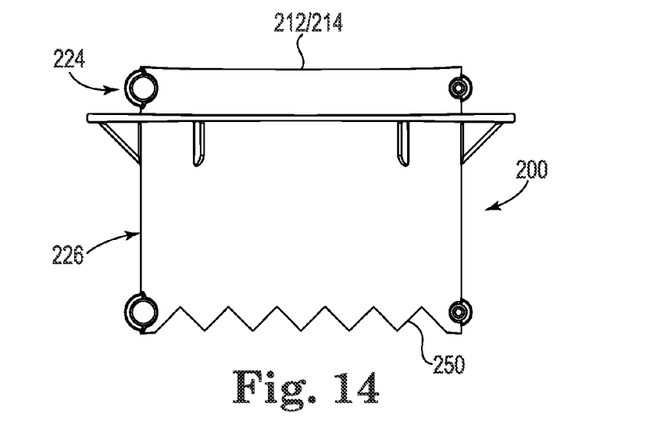
FIG. 14 is front elevational view of another shield according to the present invention with a bottom edge variation provided to the below ground portion of the shield.

For example as shown in FIG. 14, the bottom edge of components of a shield 200 can be provided with an edge to facilitate ground insertion. A serrated edge 250 is shown as comprising a series of troughs and points making up the bottom edge perimeter of the shield 200.

Figure 15:
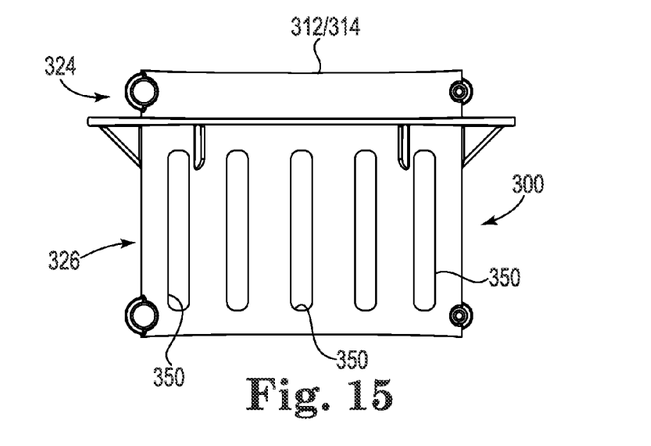
FIG. 15 is a another front elevational view of a shield of the present invention with the below ground portion of the shield including slots as features for the below ground functionality of the shield.

In FIG. 15, another shield 300 is illustrated wherein the side walls of the components 312 or 314 can include one or more slots 350 that can provide openings from plant root growth beyond the enclosure of the shield 300. This can increase root access to nutrients from the bio-decomposition of the below ground portion 326. Also, the slots 350 can be designed and shaped to accommodate biodegradation. Slots 350 create open spaces within the structural design of the below ground portion 326 of the shield 300, which not only reduce the quantity of material that is to degrade, but also to create additional surface area that is subject to degradation by contact with naturally occurring microorganisms, as discussed above. By utilizing any number of sized and shaped slots, openings or zones of reduced thickness, biodegradation can be effectively predicted and controlled. Divergence of the illustrated slots 350 from the top toward the bottom of the below ground portion 326 provides for adequate containment while allowing increasingly greater root system growth at a lower portion of the shield 300 for deeper root development. Also, the diverging slot design of slots 350 facilitate injection molding by providing for easier product separation from the injection molds.

It is contemplated that any number of slots, openings, reduced thickness zones, or other surface features can be utilized with variations to configurations provided to any one or more wall portions of the shield's below ground portion. As above, such features can be utilized in the design of a controlled biodegradable shield. With the use of injection moldable Biodegradable Plastic, any features capable of injection molding can be provided to containers of the present invention.

It is contemplated that other structural features can be added along interior or exterior surface portions along the shield components, respectively. Such features can include reinforcing elements like ribs, gussets, bosses and the like to create strength features or to create zones of weakness as may also be desired.

The invention claimed is:

1. A plant shield for being partially buried in soil to surround a plant and for providing above-ground protection from ground travelling pests, the shield comprising a walled structure surrounding and creating an open-ended enclosure, the shield comprising a first portion to be used as an above the ground portion and a second portion to be used as a below the ground portion that are structurally divided from one another by a divider that extends from and along an external surface of the walled structure in a similar direction as the walled structure surrounds the enclosure, the divider element comprising a ground engagement surface for limiting insertion of the shield into the soil,
   wherein the divider extends so as to completely surround the shield along its external surface creating a fully surrounding ground engagement surface; and
   wherein the walled structure comprises plural components with each shield component creating a portion of the enclosure, whereby the shield can be assembled about a plant as such plant is previously planted in the soil.

2. The shield of claim 1, wherein the shield components include complimentary alignment elements provided along side edges of each component that facilitate positioning and assembly of the plural shield components to one another to create the open-ended enclosure.

3. The shield of claim 2, wherein a first side edge of one shield component includes a set of tabs that extend from the edge and a second side edge of the one shield component includes a set of complimentary pockets at similar spacing as the tabs.

4. The shield of claim 1, wherein the divider comprises plural divider elements with one divider element extending along each shield component so that when the shield components are assembled, the fully surrounding ground engagement surface is provided.

5. The shield of claim 1, wherein the above ground portion comprises a portion of the walled structure above the divider that provides a continuous barrier for above the ground in use surrounding the enclosure.

6. The shield of claim 5, wherein the below the ground portion comprises a portion of the walled structure below the divider that includes at least one open area in the direction of extension of the divided but below the divider.

7. The shield of claim 6, wherein open areas are provided along a bottom edge of the below the ground portion to create a serrated bottom edge to facilitate ground insertion into the soil.

8. The shield of claim 6, wherein open areas are provided between the divider and a bottom edge of the below the ground portion.

9. The shield of claim 1, wherein the shield comprises a Biodegradable Plastic that includes plant nutrients within the Biodegradable Plastic.

10. The shield of claim 9, wherein the Biodegradable Plastic comprises an injection moldable Biodegradable Plastic.

11. The shield of claim 10, wherein the injection moldable Biodegradable Plastic is a 360 Day Garden Compostable Plastic.

12. The shield of claim 10, wherein the injection moldable Biodegradable Plastic is a 180 Day Garden Compostable Plastic.

13. The shield of claim 10, wherein the injection moldable Biodegradable Plastic is a 90 Day Garden Compostable Plastic.

14. The shield of claim 10, wherein the injection moldable Biodegradable Plastic is a 45 Day Garden Compostable Plastic.

15. The shield of claim 10, wherein the injection moldable Biodegradable Plastic comprises an injection moldable polymer selected from the group consisting of polylactic acid polymer, polyhydroxyalkanoate polymer, starch based resin, cellulose esters, biobased polyethylene compounds, and mixtures thereof.

16. The shield of claim 10, wherein the injection moldable Biodegradable Plastic comprises polylactic acid polymer.

17. The shield of claim 10, wherein the injection moldable Biodegradable Plastic comprises a soy protein.

18. The shield of claim 10, wherein the injection moldable Biodegradable Plastic comprises an organic filler material.

19. The shield of claim 18, wherein the organic filler material is selected from the group consisting of polyethylene glycol, glycerol, zein, corn starch, distillers dry grains with solubles, and mixtures thereof.

20. The shield of claim 9, wherein the Biodegradable Plastic is an Industrially Compostable Plastic.

* * * * *